Figures 1, 2:
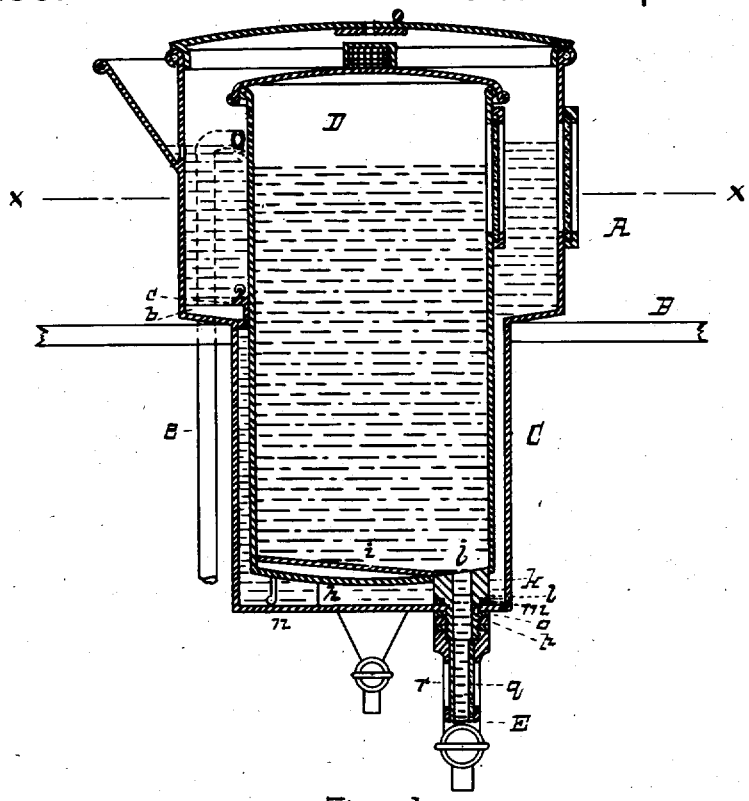

F. W. MOSELEY.

Milk-Cooler.

No. 9,156. Reissued April 13, 1880.

WITNESSES.

W. S. Bellows.

Chas. E. Hibbard

INVENTOR.

Fredrick W. Moseley.

By Charles B. Tilden

Attorney

UNITED STATES PATENT OFFICE.

FREDRICK W. MOSELEY, OF POULTNEY, VERMONT.

MILK-COOLER.

SPECIFICATION forming part of Reissued Letters Patent No. 9,156, dated April 13, 1880.

Original No. 218,765, dated August 19, 1879. Application for reissue filed October 15, 1879.

*To all whom it may concern:*

Be it known that I, FREDRICK W. MOSELEY, of Poultney, in the county of Rutland and State of Vermont, have invented certain new and useful Improvements in Milk-Coolers, of which the following is a specification, reference being had to the accompanying drawings, in which—

Figure 1 is a vertical section, and Fig. 2 is a cross-section taken upon the plane *x x* of Fig. 1.

My invention relates to apparatus for raising cream from milk, and more especially to that class of inventions in which is embodied the cold, deep-setting, or Swedish method.

This method is based upon the well-known fact that reduction of the temperature of a body of milk to 40° or even to 45° Fahrenheit will cause the cream to form upon or rise to the surface in very much less time than is required when the milk remains at its ordinary temperature. This saving of time is so great as to preclude the necessity of storing the milk for a longer period than from one milking to the next, thus accomplishing a great economy in the space and furniture of the dairy, as well as other important advantages.

In practicing this method it is particularly desirable that the temperature of the milk shall be reduced to the required point with the greatest possible speed and with the least possible expenditure of the refrigerating medium or material. To this end it is indispensable that the milk shall be confined within a vessel which is wholly surrounded by or inclosed within a refrigerating-chamber, since exposure of any portion will result in a corresponding loss of refrigeration, and consequent waste of time and expense.

The refrigerating medium usually employed in this class of apparatus being water-cooled to the required point by ice, it is evident that the space between the milk-vessel and the outer envelope, within which the water is contained, must be contracted within the smallest limits consistent with successful operation, since to obtain the best results in the shortest possible time there must be complete and speedy circulation of the water throughout the refrigerating-chamber. It is evident that every unnecessary ounce of liquid will consume the ice without affecting the temperature of the milk, while it will delay the final result and add materially to the expense.

These conditions being indispensable to the success of this class of inventions, it is also extremely desirable to provide means whereby the cream after rising can be quickly, conveniently, and perfectly separated from the milk without removing the milk-vessels from the refrigerating-chamber, the objections to such removal being that it not only causes an entire change of air within the refrigerating-chamber and an excessive wasting of the ice in consequence, but involves, moreover, great labor, a large expenditure of time and constant drenching of the operator's clothing and the floor with ice-cold water. It may also be added that unless considerable care is exercised in handling the milk-vessels more or less loss of cream will be suffered, since any degree of agitation is liable to break up the separated cream and cause it to mingle again with the milk.

The usual method of separating the milk from the cream in this class of apparatus is to draw the former off from under the cream by means of a faucet or cock placed in the bottom of the milk-vessel. This mode allows the cream to gradually descend as the milk upon which it floats is withdrawn, until finally the cream alone is left, when the cock is turned. In order to detect the approach of the body of cream toward the bottom of the can, a transparent pane has been set in the side, near the bottom, through which the contents of the can may be observed by the operator and the descent of the body of cream detected and arrested at the proper moment.

This method might answer the purpose were it not for the fact that, the transparent pane being in the body of the can and the latter being surrounded by the refrigerating-chamber filled with water, it is wholly impossible to use the transparent pane unless the milk-vessel is removed from the refrigerating-chamber. Even when a similar glass is inserted in the side of the outer envelope, it is still impossible to draw off the milk and at the same time detect the approach of the cream-line unless the body of water contained within the refrigerating-chamber be first withdrawn, as no sufficient quantity of light enters to penetrate the body of water and illuminate the interior of the can. Also, where the body of the can is carried down through the bottom of the outer or refrigerating jacket and the glass pane set in the portion so projecting, equal objection arises, since the exposure of so large an area of the milk-vessel will largely increase the consumption of ice, delay the process, and seriously affect the convenience and economy of the apparatus, by reason of the fact that it is necessary to solder the milk-vessel to the outer envelope at the point where it projects through the bottom in order to form a tight joint. Therefore, when any part becomes broken or unfit for use the whole apparatus must be thrown out of service and sent out for repairs, or a workman must be summoned to repair it on the spot.

The object of my invention therefore is to remedy the objections arising to the several forms of apparatus mentioned by providing a cooler wherein the milk may be reduced to the required temperature with the least possible expenditure of ice and in the shortest time, and at the same time to provide means whereby the milk may be drawn off from under the cream from a milk-vessel wholly contained in and surrounded by an outer refrigerating-envelope, and the approach of the cream instantly detected and arrested at the proper point without the necessity of removing the milk-vessel, without withdrawing the water surrounding it, and without opening the refrigerating-chamber.

To this end my invention consists, first, in the combination, with a milk vessel or can, of a refrigerating chamber or envelope having its lower portion of greatly diminished size, so as to form a jacket or well surrounding the lower portion of the milk-vessel, the space between the two being filled with water entirely surrounding that portion of said vessel, the enlarged space above being adapted to receive a suitable quantity of ice, whereby a rapid circulation and uniform low temperature of the entire contents of the refrigerating-chamber are obtained and the necessary reduction of the temperature of the milk is effected in the shortest possible time and with the utmost economy of material; second, in the combination, with a milk-vessel wholly surrounded by a refrigerating chamber or envelope, of a discharge-pipe leading from the lowest point of said milk-vessel through the refrigerating-chamber, said pipe being provided with openings covered by a transparent pane, whereby the flowing current of milk may be watched and the approach of the floating body of cream detected by means of the detached flakes of cream drawn by the flowing currents of milk from the under surface of the descending cream-stratum and discharged with the last portions of the milk, in the manner fully hereinafter set forth; third, in the combination of a refrigerating-chamber having a contracted lower portion, a milk-vessel removably secured therein and wholly surrounded thereby, and a nipple extending through the space between the can or milk-vessel and the surrounding well; fourth, in the combination, with the refrigerating-chamber and the milk-vessel wholly surrounded thereby, of a bracket attached to the wall of the former and lugs secured to the side of the can to engage with said bracket and lock the milk-vessel in place in the refrigerating-chamber.

A indicates a refrigerating envelope or chamber, which may be supported by any suitable stand, B. The chamber A is throughout its upper part of a diameter considerably larger than the inclosed can D; but its lower portion, C, is greatly contracted, until but a narrow annular space is left between the can and the wall of the chamber. The can D is of uniform size, and when placed within the chamber A it extends above the contracted part or well C up into the larger part of the chamber. If, now, the well C is filled with water, which rises into the enlarged space above, leaving room for the introduction of ice, the colder water surrounding the ice will sink and pass down into the well C, being replaced by the warmer portions therein. This circulation will speedily become rapid, and will continue until the milk is reduced to a low temperature, the required point of 45° or 40° Fahrenheit being soon reached. The volume of water being comparatively small, every pound of ice is utilized, and at the same time the milk-can is almost wholly surrounded by the refrigerating material. The volume of this material being small insures great rapidity of circulation, and a consequent economy of time and material.

These advantages will be more apparent if it is considered that a single refrigerating-chamber may be constructed with a series of wells, C, each one of which will receive a separate milk-can, while the enlarged upper portion will contain ice packed around the several cans. If such a chamber were made of uniform size from top to bottom, a very large volume of water would be required to fill the same, and for the purpose of reducing and keeping this greater volume of fluid down to the required temperature a far greater quantity of ice would be required without either accelerating or aiding the final result.

By providing the refrigerating-chamber with a contracted lower portion I gain, also, another great advantage—viz., facility for securing the can D in position. This purpose is effected by securing to the bottom of the enlarged part A a small bracket, *b*, which projects over the edge of the well C and engages with a lug, *c*, upon the can.

The bottom *k* of the can D is dish-shaped, and to its interior is secured an inclined false bottom, *i*, so that the liquid contained in the can is caused to flow toward the discharge-opening *j* situated near one side of the can. This opening leads into a hollow screw-nipple, *k*, which is soldered into the bottom of the can, and which has a shoulder, *l*, to receive a packing-ring, *m*, that bears against the bottom of the well C.

Suitable feet *n* serve to steady the can in an upright position. The nipple *k* projects through the bottom of the well C, and it receives a packing-ring, *o*, and a nut, *p*, so that when said nut is screwed up tight joints are formed both inside and outside the bottom of the well.

To the lower end of the nipple *k* is attached a discharge-tube, E, illuminated by openings formed therein, which are covered by a transparent pane, so that the liquid flowing through the tube can be observed. At the lower end of the tube is placed a suitable cock, by turning which the flow of milk can be arrested at pleasure. By illuminating the tube by two openings the presence of floating particles in the stream can be easily detected, as the stream is illuminated by transmitted light, rendering it very distinct to the eye of the operator. As the milk is discharged and the superincumbent body of cream sinks gradually toward the bottom of the milk-vessel, the currents of the milk, passing to the outlet *j*, begin to flow against the lower surface of the cream-stratum, and at once small flakes of cream are loosened, and finally detached therefrom, and being taken into the current they are discharged through the eduction-tube E. As soon as they pass the illuminated openings of the tube their presence is detected by the eye, the smallest flakes being readily seen through the transparent panes. Experience has demonstrated that these flakes of cream are borne upon the last portions of the milk lying beneath the cream, and their appearance is the signal for arresting the flow by closing the cock E.

I am thus enabled by this form of construction to draw off the milk from under the cream, drawing through the refrigerating-chamber and through the refrigerating medium, and to detect the arrival of the cream-line at the bottom of the can by means of the sudden appearance in the illuminated tube of cream-flakes borne upon the last portion of the escaping milk.

All necessity of removing the cans from the refrigerating-chamber or of withdrawing the water therefrom is wholly avoided, while at the same time I draw off from an inclosed can, every part of which is wholly surrounded by the refrigerating-envelope. This result can be obtained only by drawing off in the manner described and detecting the arrival of the cream by the appearance of flakes in the current through the illuminated tube. The latter element is essential, for if it is attempted to detect the cream-flakes in the receptacle for the discharged milk trouble will be sure to ensue, as they will be likely to mingle with the milk as they fall into the receptacle, or to be carried down by currents and escape notice, so that, unless the discharge-tube provided with transparent panes is used, the operator would run the risk of detecting the arrival of the cream by finding a large part of it in the receptacle for the discharged milk.

Having thus fully described my invention, what I claim as new, and desire to secure by Letters Patent of the United States, is—

1. In a milk-cooling apparatus, the combination, with the milk vessel or can, of an outer refrigerating envelope or chamber, the lower portion thereof being contracted to closely approach the can, while the upper part is expanded to provide space for the refrigerating material, all substantially as and for the purpose set forth.

2. In a milk-cooling apparatus, the combination, with a refrigerating-chamber, of a milk vessel or can contained therein and wholly surrounded thereby and an eduction or discharge tube leading from said milk-vessel through the refrigerating-chamber to the exterior, said tube being illuminated by transparent media to enable the flowing current of milk to be seen as it passes through the tube, all substantially as and for the purpose set forth.

3. In a milk-cooling apparatus, a milk vessel or can having an outer refrigerating envelope or chamber, the lower portion thereof being contracted to approach the can, while the upper part is expanded to provide space for the refrigerating material, in combination with an illuminated faucet, to which it is attached by a suitable connection extending through the space between the well and the can, substantially as and for the purpose described.

4. In a milk-cooler, the refrigerator-box A, having the contracted lower portion forming a well, in combination with the milk-receiving can D, secured within said well and extending upward through the refrigerator-box, the lower end of said can being provided with a nipple extending through the well, and the space between the can and the box and well being continuous and uninterrupted, substantially as and for the purpose set forth.

5. In combination with the refrigerating-box and its well and the can extending into said well, a bracket attached to the bottom of the refrigerating-box and extending over the edge of the well, and lugs secured to the side of the can to engage with said bracket, substantially as and for the purpose described.

In testimony whereof I have signed my name to this specification in the presence of two subscribing witnesses.

FREDRICK W. MOSELEY.

Witnesses:
OSCAR LOW,
CHAS. B. TILDEN.